US011145985B2

(12) United States Patent
Wu et al.

(10) Patent No.: US 11,145,985 B2
(45) Date of Patent: Oct. 12, 2021

(54) ELECTRONIC DEVICE

(71) Applicant: PEGATRON CORPORATION, Taipei (TW)

(72) Inventors: Chien-Yi Wu, Taipei (TW);
Ching-Hsiang Ko, Taipei (TW);
Chao-Hsu Wu, Taipei (TW);
Shih-Keng Huang, Taipei (TW);
Cheng-Hsiung Wu, Taipei (TW);
Ya-Jyun Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 749 days.

(21) Appl. No.: 16/006,735

(22) Filed: Jun. 12, 2018

(65) Prior Publication Data

US 2019/0036223 A1    Jan. 31, 2019

(30) Foreign Application Priority Data

Jul. 25, 2017 (TW) .................................. 106124894

(51) Int. Cl.
*H01Q 13/10* (2006.01)
*H01Q 1/24* (2006.01)
(Continued)

(52) U.S. Cl.
CPC .......... *H01Q 13/10* (2013.01); *G06F 1/1656* (2013.01); *G06F 1/1658* (2013.01);
(Continued)

(58) Field of Classification Search
CPC .................... H01Q 1/243; H01Q 13/10–18
See application file for complete search history.

(56) References Cited

U.S. PATENT DOCUMENTS 5,677,698 A     10/1997  Snowdon
7,129,902 B2 *  10/2006  Bancroft ................ H01Q 13/10
                                                  343/767
(Continued)

FOREIGN PATENT DOCUMENTS

CN         1201437      5/2005
CN       101895007     11/2010
(Continued)

OTHER PUBLICATIONS

"Office Action of Taiwan Counterpart Application," dated Oct. 9, 2018, pp. 1-6.

*Primary Examiner* — Andrea Lindgren Baltzell
*Assistant Examiner* — Amal Patel
(74) *Attorney, Agent, or Firm* — J.C. Patents (57) ABSTRACT

An electronic device includes a first body and a feed device. A conductive housing of the first body includes a first closed slot, a second closed slot, a feed point and a ground point. The feed device includes a circuit substrate, a feed portion, a ground portion, a first connection portion and a second connection portion. The circuit substrate includes a first surface, a second surface, first conductive holes and second conductive holes, and the first surface faces the conductive housing. The feed portion and the ground portion are disposed on the second surface. The feed portion is electrically connected to the feed point, and the ground portion is electrically connected to the ground point. The feed device and the conductive housing form an antenna. The antenna operates in first and second bands through first and second paths formed by the first and the second closed slots.

17 Claims, 7 Drawing Sheets

(51) Int. Cl.
*H01Q 21/30* (2006.01)
*H01Q 1/22* (2006.01)
*G06F 1/16* (2006.01)

(52) U.S. Cl.
CPC ......... *H01Q 1/2258* (2013.01); *H01Q 1/2266* (2013.01); *H01Q 1/243* (2013.01); *H01Q 21/30* (2013.01)

(56) References Cited

U.S. PATENT DOCUMENTS

| | | |
|---|---|---|
| 8,325,096 B2 | 12/2012 | Ayala Vazquez et al. |
| 8,441,404 B2 * | 5/2013 | Chiang .................. H01Q 21/30 343/770 |
| 10,038,249 B2 | 7/2018 | Lo et al. |
| 2013/0009833 A1 | 1/2013 | Kough et al. |
| 2014/0071009 A1 | 3/2014 | Cheng et al. |
| 2017/0155198 A1 * | 6/2017 | Lo .......................... H01Q 1/243 |
| 2017/0201006 A1 * | 7/2017 | Chiu ................... H04B 1/0458 |

FOREIGN PATENT DOCUMENTS

| | | |
|---|---|---|
| CN | 103682582 | 4/2016 |
| CN | 106816710 | 6/2017 |
| TW | 201721972 | 6/2017 |

\* cited by examiner

ELECTRONIC DEVICE

CROSS-REFERENCE TO RELATED APPLICATION

This application claims the priority benefit of Taiwan application serial no. 106124894, filed on Jul. 25, 2017. The entirety of the above-mentioned patent application is hereby incorporated by reference herein and made a part of this specification.

BACKGROUND

Field of the Invention

The disclosure relates to an electronic device and particularly relates to an electronic device of a conductive housing having closed slots.

Related Art

In recent years, the majority of laptops have a metal housing of metal characteristics to emphasize the uniqueness of a product and draw consumers' attention. In addition, an antenna is installed in the laptop to receive or emit radio waves. However, the radiation characteristic of an antenna is susceptible to the metal housing of a laptop, so the signal quality of the laptop is reduced. Therefore, how to enhance the radiation characteristic of an antenna while meeting the requirements for the design of a metal housing of a laptop has become a crucial issue for the design of an antenna of a laptop.

SUMMARY

The disclosure provides an electronic device. An antenna may be formed by a conductive housing and a feed device, so the influence of the metal housing of the electronic device on the antenna is reduced to elevate the radiation characteristic of the antenna.

The electronic device according to an embodiment of the disclosure includes a first body and a feed device. The first body has a conductive housing. The conductive housing has a first closed slot, a second closed slot, a feed point and a ground point. The feed device is disposed in the first body. The feed device includes a circuit substrate, a feed portion, a ground portion, a first connection portion and a second connection portion. The circuit substrate has a first surface, a second surface, a plurality of first conductive holes and a plurality of second conductive holes, and the first surface faces the conductive housing and is opposite to the second surface. The feed portion and the ground portion are disposed on the second surface. The first connection portion and the second connection portion are disposed on the first surface. The feed portion is electrically connected to the feed point through the plurality of first conductive holes and the first connection portion of the circuit substrate, and the ground portion is electrically connected to the ground point through the plurality of second conductive holes and the second connection portion of the circuit substrate. The feed device and the conductive housing form an antenna. The antenna operates in a first band through a first path formed by the first closed slot, and operates in a second band through a second path formed by the second closed slot.

In view of the foregoing, the feed device in the electronic device according to the embodiments of the disclosure includes the feed portion and the ground portion disposed on the circuit substrate, and the feed portion and the ground portion may be electrically connected to the feed point and the ground point on the conductive housing. Furthermore, the feed device and the conductive housing may form the antenna that may operate in the first band and the second band through the first path and the second path formed by the first closed slot and the second closed slot of the conductive housing. In doing so, the influence the metal housing of the electronic device has on the antenna may be decreased to elevate the radiation characteristic of the antenna.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
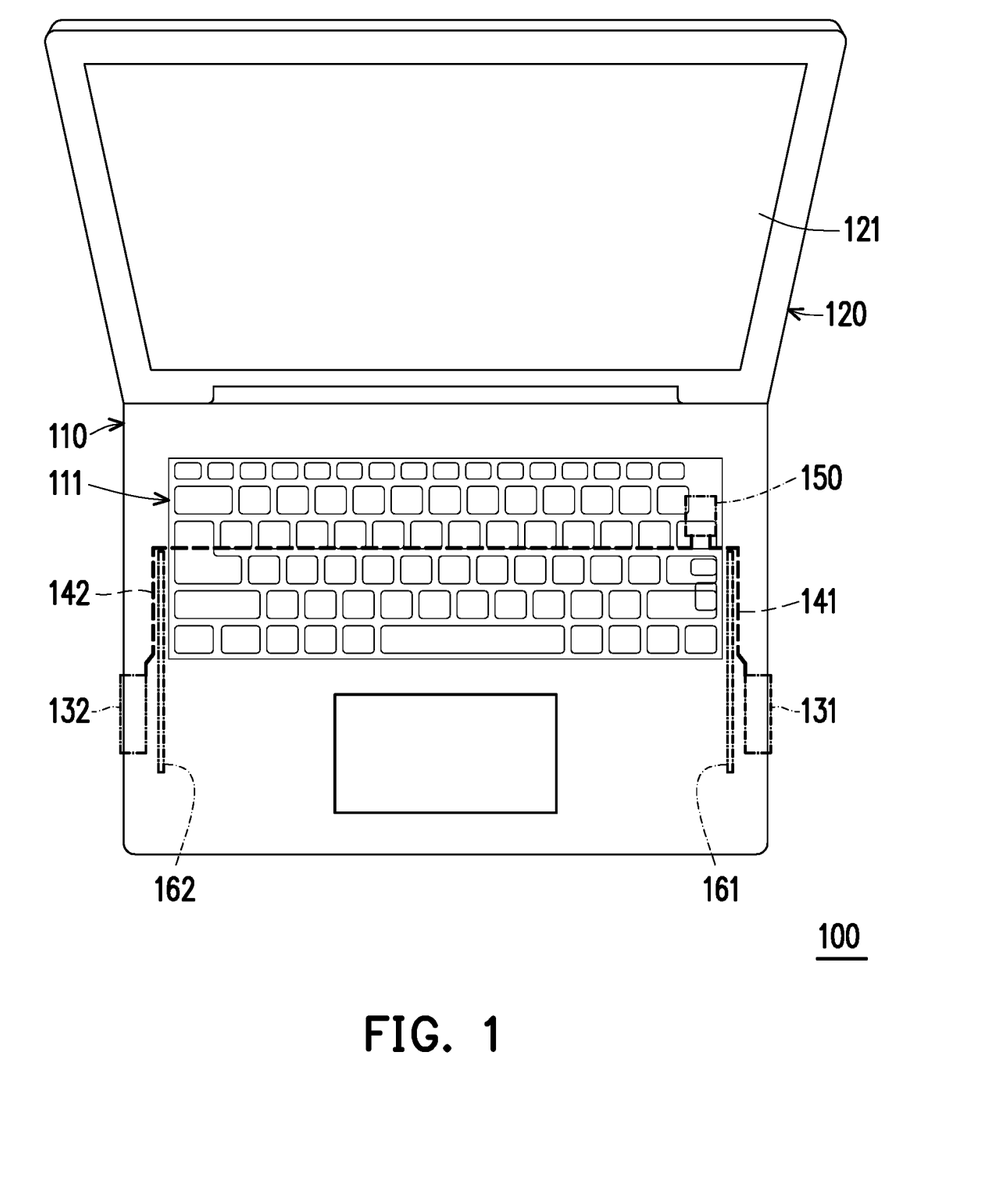
FIG. 1 is a schematic view of an electronic device according to an embodiment of the disclosure.

FIG. 1 is a schematic view of an electronic device according to an embodiment of the disclosure. As shown in FIG. 1, an electronic device 100 may be, for example, a laptop, and includes a first body 110 and a second body 120. The first body 110 includes a keyboard module 111. The second body 120 includes a display panel 121. Besides, the second body 120 is pivoted to a side of the first body 110 and rotates with respect to the first body 110.

The electronic device 100 further includes an antenna 131, an antenna 132, a coaxial cable 141, a coaxial cable 142, a transceiver 150, a metal retaining wall 161 and a metal retaining wall 162. For easy description, FIG. 1 only shows the positions of the antenna 131, the antenna 132, the coaxial cable 141, the coaxial cable 142, the transceiver 150, the metal retaining wall 161 and the metal retaining wall 162 on the first body 110 in dotted lines. The antenna 131 and the antenna 132 are disposed on the left and right sides of the first body 110 and may be electrically connected to the transceiver 150 through the coaxial cable 141 and the coaxial cable 142 respectively. In operation, the transceiver 150 may transmit feed signals to the antenna 131 and the antenna 132 respectively to allow the antenna 131 and the antenna 132 to emit radio waves.

It is worth mentioning that housings of the first body 110 and the second body 120 may be formed of metal materials respectively. In addition, the metal housing of the first body 110 may be configured to form a portion of the antenna 131 and the antenna 132 respectively. In doing so, the influence of the metal housing of the electronic device 100 on the antenna 131 and the antenna 132 may be decreased so as to elevate the radiation properties of the antenna 131 and the antenna 132 and so as to make the antenna 131 and the antenna 132 applicable to the electronic device 100 with an extremely thin housing.

Figure 2:
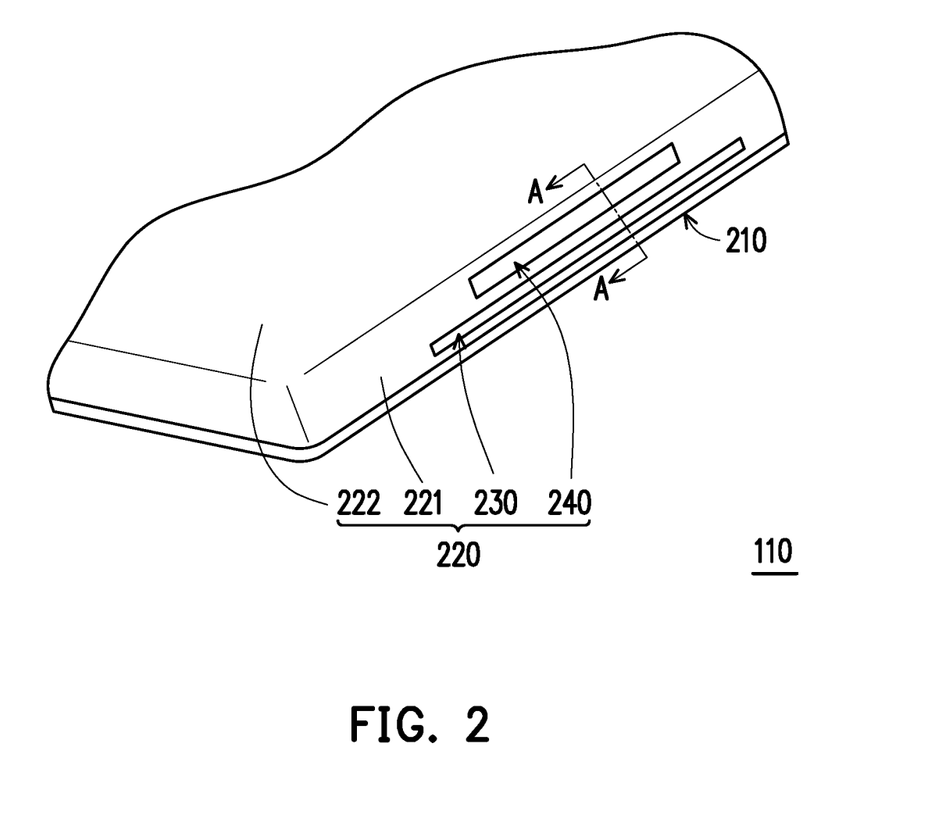
FIG. 2 is a schematic view of a first body according to an embodiment of the disclosure.

In order to make the disclosure better understood by one of ordinary skill in the art, below are descriptions about the detailed structure of the antenna 131. Specifically, FIG. 2 is a schematic view of a first body according to an embodiment of the disclosure. As shown in FIG. 2, the first body 110 includes a conductive cover 210 and a conductive housing 220 that stack with each other. Besides, the conductive cover 210 has an aperture to expose the keyboard module 111. The conductive housing 220 includes a first closed slot 230 and a second closed slot 240. In the embodiment of FIG. 2, the first closed slot 230 and the second closed slot 240 are disposed on sidewalls 221 located on sides of the conductive housing 220, and the first closed slot 230 is parallel to the second closed slot 240. In another embodiment, the first closed slot 230 may be disposed on the sidewall 221 of the conductive housing 220, and the second closed slot 240 may be disposed on a bottom wall 222 of the conductive housing 220.

Figure 3:
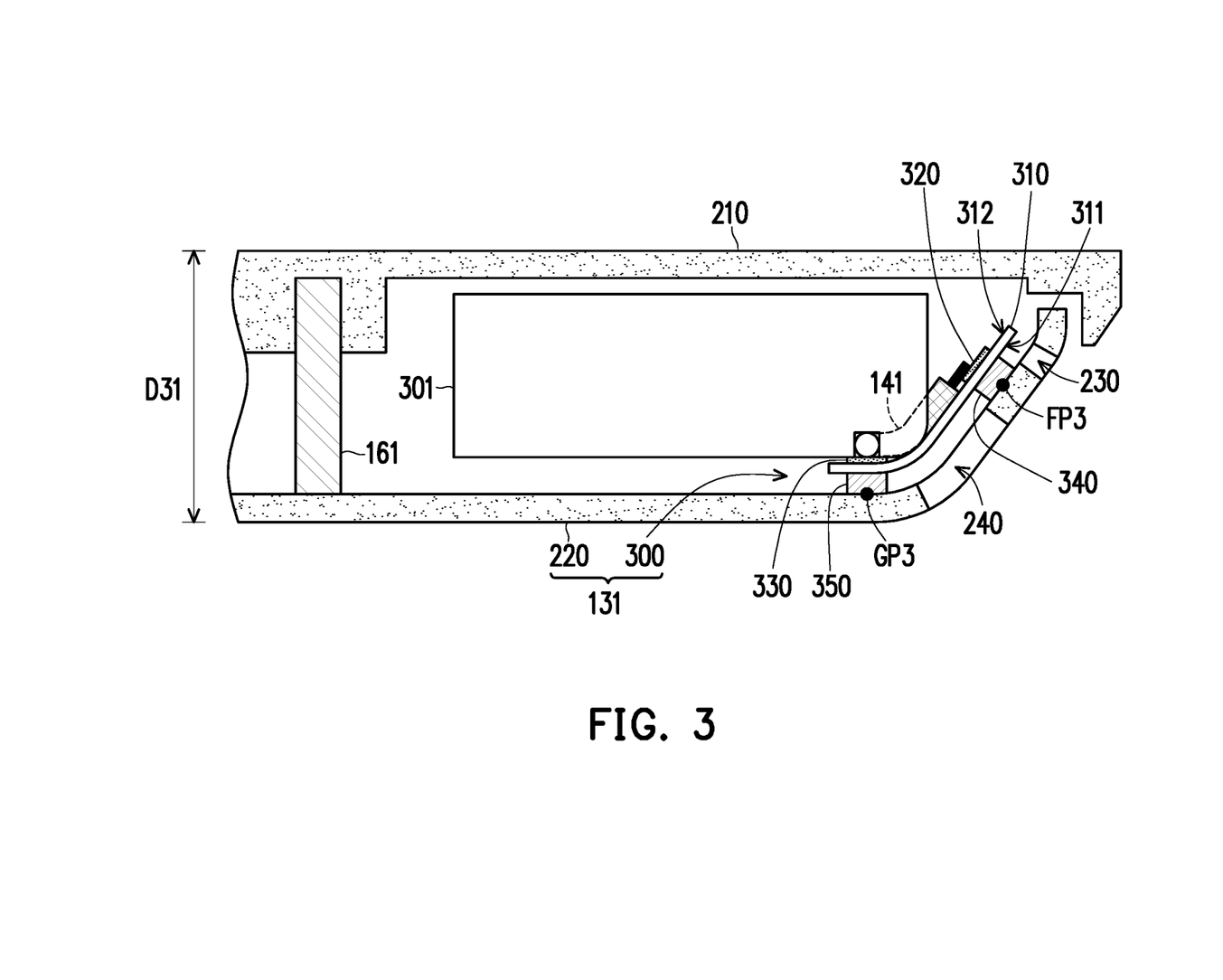
FIG. 3 is a local cross-sectional view taken along line A-A of FIG. 2.

FIG. 3 is a local cross-sectional view taken along line A-A of FIG. 2. As shown in FIG. 3, the electronic device 100 further includes a feed device 300 and a support device 301. The feed device 300 and the support device 301 are disposed in the first body 110, and the feed device 300 and the coaxial cable 141 may be attached to the support device 301. Besides, the support device 301 may be, for example, a supporting frame of a loudspeaker. The feed device 300 is close to the first closed slot 230 and the second closed slot 240, and includes a circuit substrate 310, a feed portion 320, a ground portion 330, a first connection portion 340 and a second connection portion 350. The circuit substrate 310 has a first surface 311 and a second surface 312. The first surface 311 is opposite to the second surface 312, and the first surface 311 of the circuit substrate 310 faces the conductive housing 220. In addition, the circuit substrate 310 may be, for example, a double-faced flexible printed circuit board, and has a plurality of first conductive holes 431 and second conductive holes 432. The feed portion 320 and the ground portion 330 are disposed on the second surface 312 of the circuit substrate 310. The first connection portion 340 and the second connection portion 350 are disposed on the first surface 311 of the circuit substrate 310.

The conductive housing 220 further includes a feed point FP3 and a ground point GP3. The feed point FP3 is disposed between the first closed slot 230 and the second closed slot 240, and the feed point FP3 and the ground point GP3 are disposed on two sides of the second closed slot 240. In addition, the feed portion 320 on the circuit substrate 310 may be electrically connected to the feed point FP3 through the plurality of first conductive holes 431 and the first connection portion 340 of the circuit substrate 310, and the ground portion 330 on the circuit substrate 310 may be electrically connected to the ground point GP3 through the plurality of second conductive holes 432 and the second connection portion 350 of the circuit substrate 310.

In operation, the feed device 300 and the conductive housing 220 may form the antenna 131. The transceiver 150 may transmit feed signals to the feed device 300 in the antenna 131 through the coaxial cable 141. In doing so, the feed device 300 may be configured to energize the antenna 131 to operate in a first band through a first path formed by the first closed slot 230 and operate in a second band through a second path formed by the second closed slot 240.

It should be noted that since the conductive housing 220 of the electronic device 100 is a portion of the antenna 131, the influence of the metal housing (such as the conductive cover 210 and the conductive housing 220) of the electronic device 100 on the antenna 131 may be decreased. In doing so, the antenna 131 may have elevated radiation properties to be applicable to the electronic device 100 with an extremely thin housing. For example, as shown in FIG. 3, the feed device 300 may be, for example, disposed in the first body 110 with a thickness D31 of 5.9 mm, and the antenna 131 formed by the feed device 300 and the conductive housing 220 of the first body 110 may have preferable radiation properties.

In addition, the metal retaining wall 161 is disposed in the first body 110 and is electrically connected to the conductive cover 210 and the conductive housing 220. The feed device 300 of the antenna 131 is disposed between the metal retaining wall 161 and the sidewall 221 of the conductive housing 220. In doing so, the metal retaining wall 161 may form a 1.5-wavelength cavity resonance structure of the second band to elevate the radiation characteristic of the antenna 131. For example, a motherboard (not shown) is disposed in the middle of the first body 110, and the metal retaining wall 161 is disposed between the motherboard and the antenna 131 to block noises from electronic elements on the motherboard. In doing so, the influence of the electronic elements of the motherboard on the antenna may be decreased.

Figure 4:
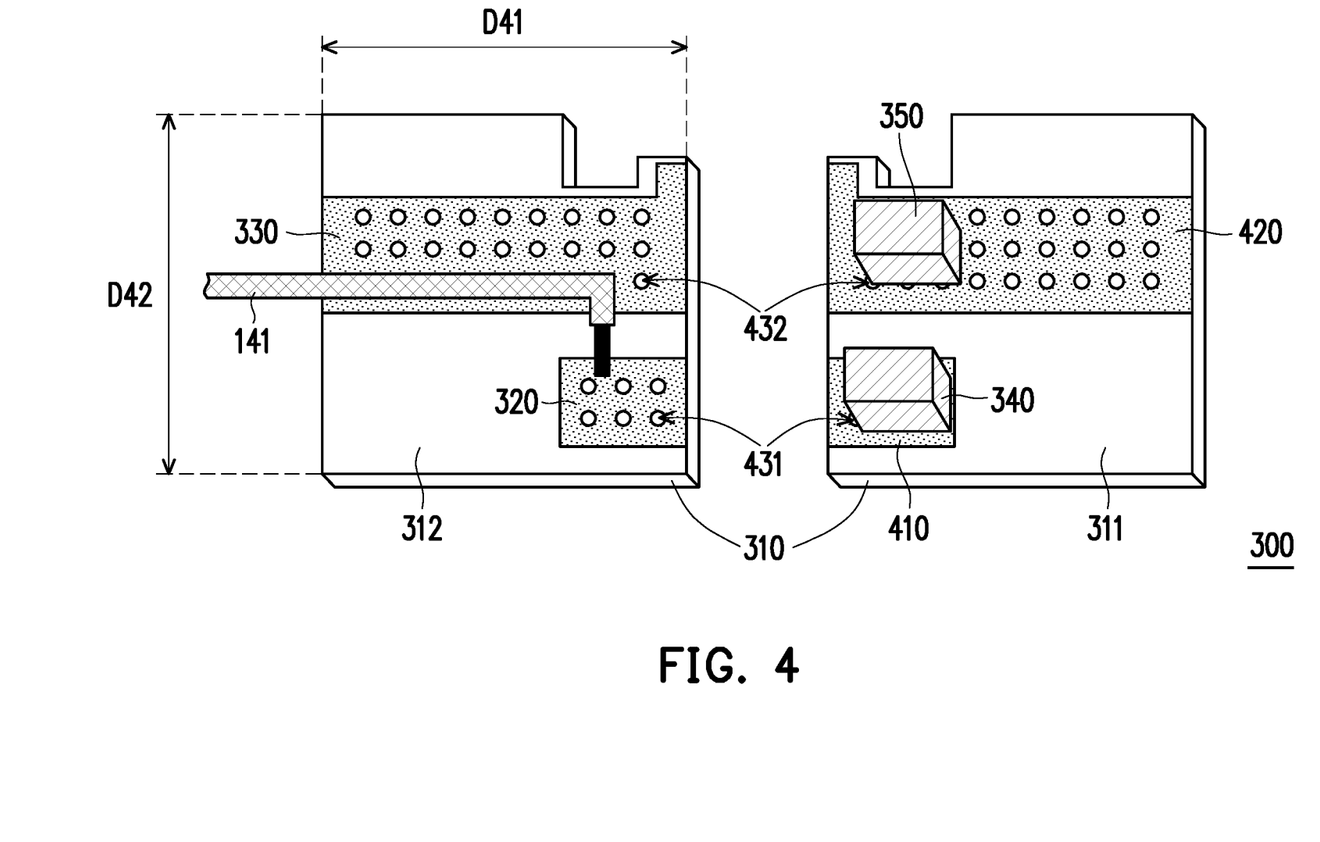
FIG. 4 is a schematic view of a structure of a feed device according to an embodiment of the disclosure.
Figure 5:
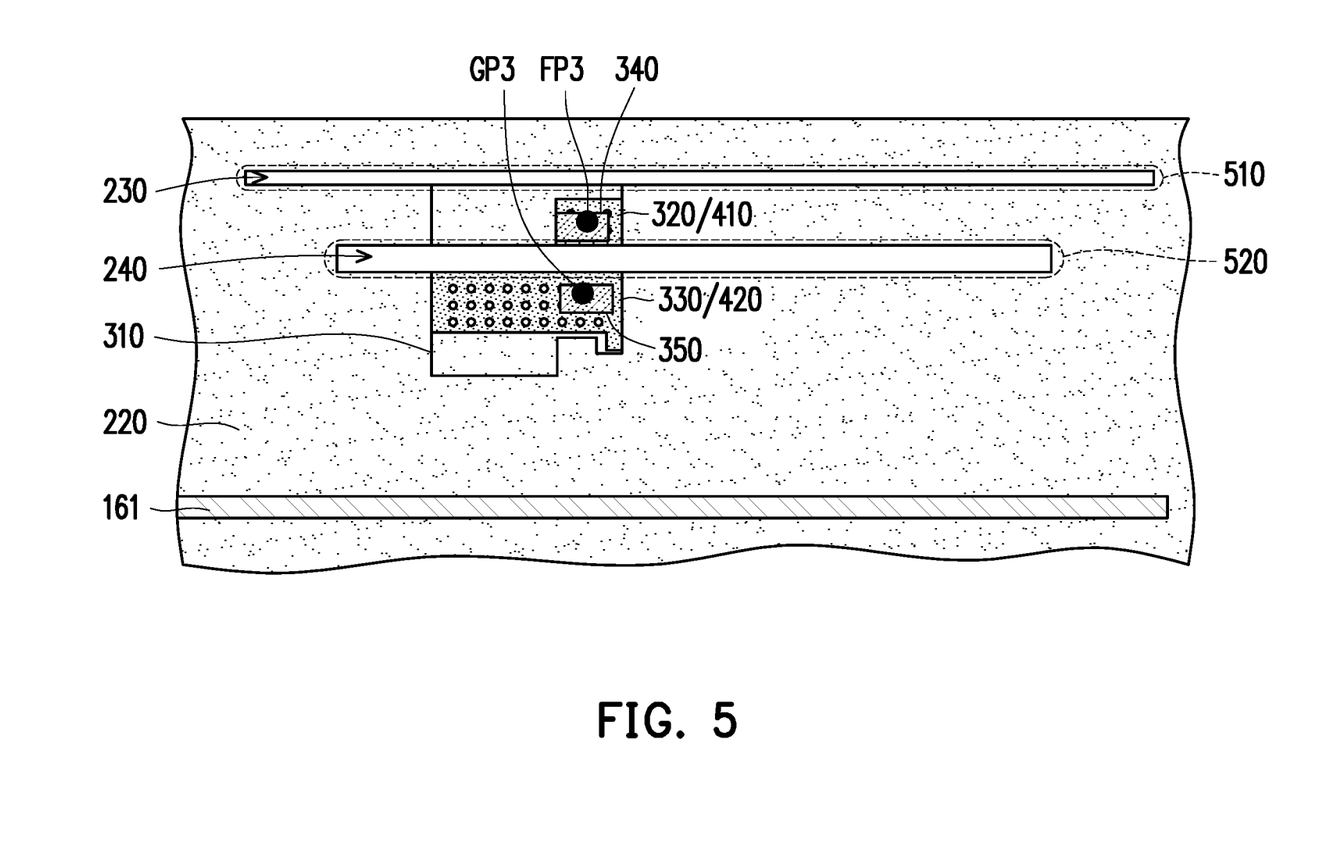
FIG. 5 is a schematic view of projection of an antenna according to an embodiment of the disclosure.

Furthermore, FIG. 4 is a schematic view of a structure of a feed device according to an embodiment of the disclosure. The left portion of FIG. 4 illustrates the coaxial cable 141 to which the feed device 300 is connected, and the feed portion 320 and the ground portion 330 that are disposed on the second surface 312 of the circuit substrate 310 and are included by the feed device 300, while the right portion of FIG. 4 illustrates the first connection portion 340 and the second connection portion 350 that are disposed on the first surface 311 of the circuit substrate 310 and are included by the feed device 300. In addition, FIG. 5 is a schematic view of projection of an antenna according to an embodiment of the disclosure, and further illustrates the metal retaining wall 161 capable of enhancing the radiation characteristic of the antenna 131.

As shown in FIG. 4, an inner conductor of the coaxial cable 141 is electrically connected to the feed portion 320 that is disposed on the second surface 312 of the circuit substrate 310, and an outer conductor of the coaxial cable 141 is electrically connected to the ground portion 330 that is disposed on the second surface 312 of the circuit substrate 310. As shown in FIG. 5, an orthographic projection of the feed portion 320 on the conductive housing 220 and an orthographic projection of the ground portion 330 on the conductive housing 220 are located on two sides of the second closed slot 240. In addition, the feed portion 320 is electrically connected to the feed point FP3 through the plurality of first conductive holes 431 and the first connection portion 340 of the circuit substrate 310, and the ground portion 330 is electrically connected to the ground point GP3 through the plurality of second conductive holes 432 and the second connection portion 350 of the circuit substrate 310. In doing so, the feed device 300 may be configured to energize the antenna 131 that is equivalent to a double-bandwidth closed slot antenna.

For example, a first path 510 (i.e. a first closed loop) may be formed around the first closed slot 230, and a second path 520 (i.e. a second closed loop) may be formed around the second closed slot 240. The antenna 131, when energized by the feed device 300, may generate a first resonance mode through the first path 510 to be able to operate in the first band. On the other hand, the antenna 131 may generate a second resonance mode through the second path 520 to be able to operate in the second band. In addition, one of ordinary skill in the art may adjust the shape or/and size of the first closed slot 230 based on design needs to adjust the frequency and bandwidth of the first band, and may adjust the shape or/and size of the second closed slot 240 based on design needs to adjust the frequency and bandwidth of the second band.

In the embodiment, a length D41 and a width D42 of the circuit substrate 310 may be 15 mm and 12 mm respectively. A length and width of the first closed slot 230 may be 85 mm and 1 mm respectively. A length and width of the second closed slot 240 may be 55 mm and 3 mm respectively. A size of the metal retaining wall 161 may be 90 mm×2 mm×4.7 mm. In addition, a frequency range of the first band covered by the antenna 131 may be, for example, 2.4 GHz to 2.5 GHz, and a frequency range of the second band covered by the antenna 131 may be, for example, 5.15 GHz to 5.875 GHz. In addition, according to an embodiment of the disclosure, plastic may be filled in the first closed slot 230 and the second closed slot 240 respectively by insert molding technology for the dust-proof purpose and the protection of interior devices of the first body 110.

Referring to FIG. 4, below are further descriptions about the detailed structure of the feed device 300 of the antenna 13. Specifically, the feed device 300 further includes a feed extension portion 410 and a ground extension portion 420. The feed extension portion 410 is disposed on the first surface 311 of the circuit substrate 310 and is located between the first surface 311 and the first connection portion 340. The plurality of first conductive holes (such as the first conductive holes 431) pass through the feed extension portion 410, the circuit substrate 310 and the feed portion 320. In doing so, the feed portion 320 may be electrically connected to the feed point FP3 through the circuit substrate 310, the feed extension portion 410 and the first connection portion 340.

For example, the first connection portion 340 may be like a metal elastic piece or a conductive gasket, and may be erected on the feed extension portion 410. In the whole configuration, the first connection portion 340 may contact and be electrically connected to the feed point FP3 on the conductive housing 220. The first connection portion 340 may also be electrically connected to the feed portion 320 directly through the plurality of first conductive holes. In doing so, the feed signals from the inner conductor of the coaxial cable 141 may be transmitted to the feed point FP3 on the conductive housing 220 through the feed portion 320, the circuit substrate 310, the feed extension portion 410 and the first connection portion 340.

The ground extension portion 420 is disposed on the first surface 311 of the circuit substrate 310 and is located between the first surface 311 and the second connection portion 350. The plurality of second conductive holes (such as the second conductive holes 432) pass through the ground extension portion 420, the circuit substrate 310 and the ground portion 330. In doing so, the ground portion 330 may be electrically connected to the ground point GP3 through the circuit substrate 310, the ground extension portion 420 and the second connection portion 350.

For example, the second connection portion 350 may be like a metal dome or a conductive gasket, and may be erected on the ground extension portion 420. In the whole configuration, the second connection portion 350 may contact and be electrically connected to the ground point GP3 on the conductive housing 220. The second connection portion 350 may be electrically connected to the ground portion 330 directly through the plurality of second conductive holes. In doing so, the outer conductor of the coaxial cable 141 may conduct the ground point GP3 on the conductive housing 220 through the ground portion 330, the circuit substrate 310, the ground extension portion 420 and the second connection portion 350.

It is worth mentioning that an orthographic projection of the feed portion 320 on the circuit substrate 310 and an orthographic projection of the feed extension portion 410 on the circuit substrate 310 overlap each other and are of the same shape. Moreover, an orthographic projection of the ground portion 330 on the circuit substrate 310 and an orthographic projection of the ground extension portion 420 on the circuit substrate 310 overlap each other and are of the same shape. From a different perspective, as shown in FIG. 5, an orthographic projection of the feed portion 320 on the conductive housing 220, an orthographic projection of the feed extension portion 410 on the conductive housing 220 and the feed point FP3 on the conductive housing 220 overlap each other. An orthographic projection of the ground portion 330 on the conductive housing 220, an orthographic projection of the ground extension portion 420 on the conductive housing 220 and the feed point FP3 on the conductive housing 220 overlap each other.

Figure 6:
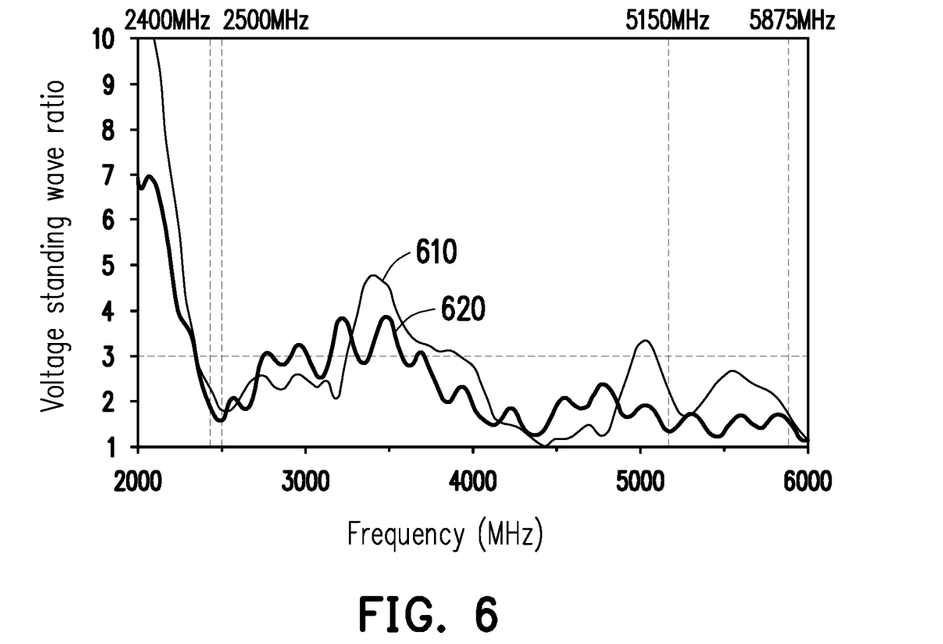
FIG. 6 is a schematic view of the voltage standing wave ratio (VSWR) of an antenna according to an embodiment of the disclosure.
Figure 7:
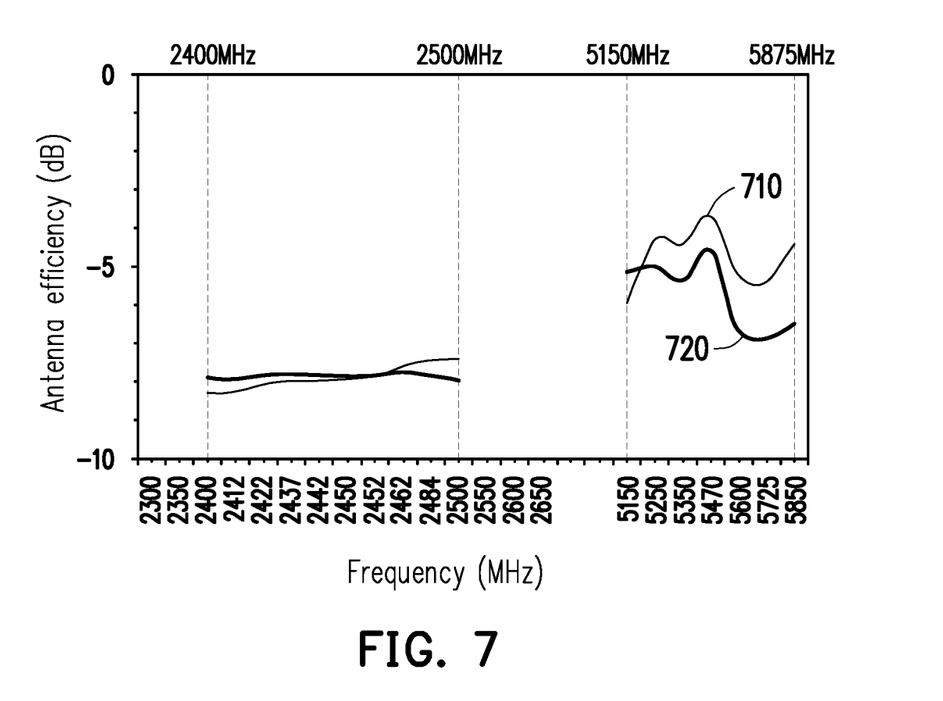
FIG. 7 is a schematic view of the antenna efficiency of an antenna according to an embodiment of the disclosure.

Referring to FIG. 1, the antenna 131 and the antenna 132 of the electronic device 100 are of the same configuration and have preferable radiation properties. Besides, the metal retaining wall 161 and the metal retaining wall 162 may be configured to elevate the radiation properties of the antenna 131 and the antenna 132. For example, FIG. 6 is a graph illustrating the voltage standing wave ratio (VSWR) of an antenna according to an embodiment of the disclosure, and FIG. 7 is a graph illustrating the antenna efficiency of an antenna according to an embodiment of the disclosure. Curves 610 and 620 of FIG. 6 are configured to denote the voltage standing wave ratio of the antenna 131 and the antenna 132 respectively, and curves 710 and 720 of FIG. 7 are configured to denote the antenna efficiency of the antenna 131 and the antenna 132. Besides, in the embodiment of FIG. 1, the antenna 131 may be electrically connected to the transceiver 150 through the coaxial cable 141 with a length of 115 mm, and the antenna 132 may be electrically connected to the transceiver 150 through the coaxial cable 142 with a length of 380 mm.

Figure 8:
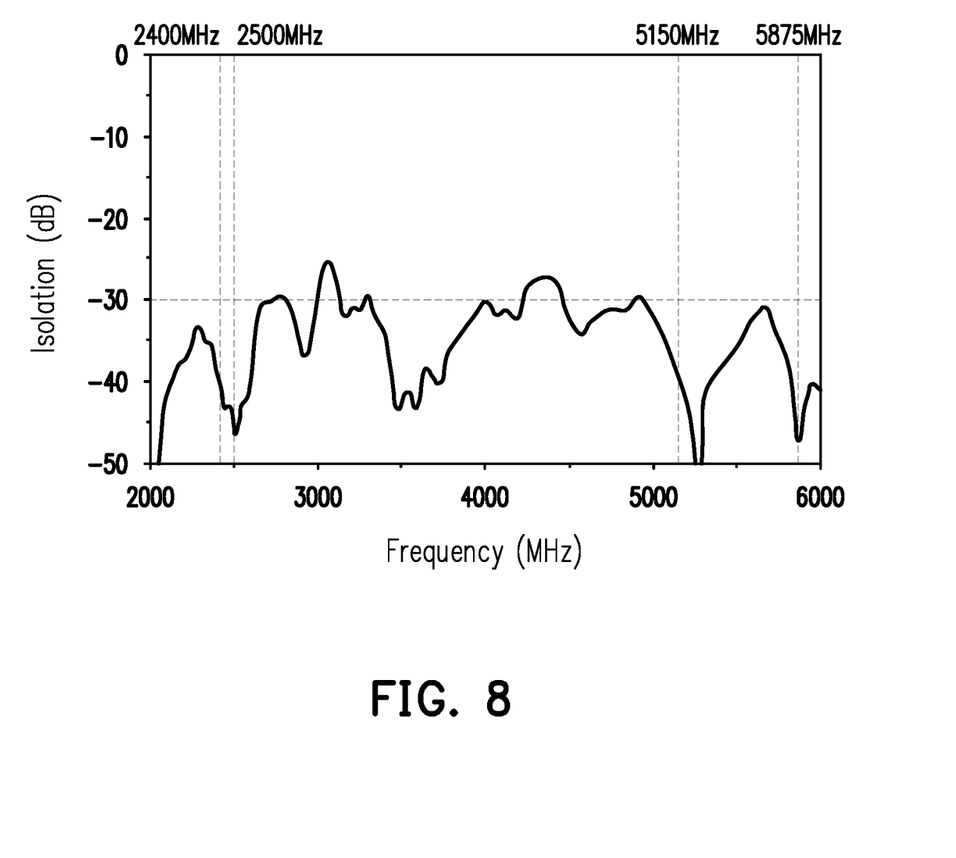
FIG. 8 is a graph of the isolation (S21) of an antenna according to an embodiment of the disclosure.

As shown in FIG. 6, the antenna 131 and the antenna 132 may operate in a band of 2.4 GHz (such as 2.4 GHz to 2.5 GHz) and a band of 5 GHz (such as 5.15 GHz to 5.875 GHz), and the voltage standing wave ratios of the antenna 131 and the antenna 132 in the bands of 2.4 GHz and 5 GHz may be smaller than 3. As shown in FIG. 7, the antenna efficiency of the antenna 131 and the antenna 132 in the band of 2.4 GHz is −7.4 dB to −8.3 dB, and the antenna efficiency of the antenna 131 and the antenna 132 in the band of 5 GHz is −3.7 dB and −6.8 dB. Furthermore, FIG. 8 is a graph illustrating the isolation (S21) of an antenna according to an embodiment of the disclosure. In the embodiment of FIG. 8, a distance between the antenna 131 and the antenna 132 is greater than 250 mm, and the isolation of the antenna 131 and the antenna 132 in the bands of 2.4 GHz and 5 GHz may be below −30 dB, so the antenna 131 and the antenna 132 do not interfere with each other and exhibit preferable antenna efficiency.

In view of the above, the first body of the electronic device according to the embodiments of the disclosure includes the conductive cover and the conductive housing stacking with each other. In addition, the feed device of the electronic device includes the feed portion and the ground portion that are disposed on the circuit substrate, and the feed portion and the ground portion may be electrically connected to the feed point and the ground point on the conductive housing respectively. Furthermore, the feed device and the conductive housing may form the antenna that may operate in the first band and the second band through the two paths formed by the two closed slots of the conductive housing. In other words, the conductive housing of the electronic device is a portion of the antenna, so the influence of the metal housing (such as the conductive cover and the conductive housing) of the electronic device on the antenna may be decreased. In doing so, the antenna may have elevated radiation properties to be applicable to the electronic device with an extremely thin housing.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
   a first body having a conductive housing, the conductive housing having a first closed slot, a second closed slot, a feed point and a ground point, wherein the first closed slot is disposed on a sidewall of the conductive housing, the first body further comprises a conductive cover, the conductive cover and the conductive housing stack with each other;
   a feed device disposed in the first body, the feed device including:
      a circuit substrate, having a first surface, a second surface, a plurality of first conductive holes and a plurality of second conductive holes, wherein the first surface faces the conductive housing and is opposite to the second surface;
      a feed portion and a ground portion, disposed on the second surface; and
      a first connection portion and a second connection portion disposed on the first surface, wherein the feed portion is electrically connected to the feed point through the plurality of first conductive holes and the first connection portion of the circuit substrate, and the ground portion is electrically connected to the ground point through the plurality of second conductive holes and the second connection portion of the circuit substrate; and
   a metal retaining wall, disposed in the first body and electrically connected to the conductive cover and the conductive housing, wherein the feed device is disposed between the metal retaining wall and the sidewall,
   wherein the feed device and the conductive housing form an antenna, the antenna operates in a first band through a first path formed by the first closed slot and operates in a second band through a second path formed by the second closed slot.

2. The electronic device of claim 1, further comprising a coaxial cable, wherein an inner conductor of the coaxial cable is electrically connected to the feed portion and an outer conductor of the coaxial cable is electrically connected to the ground portion.

3. The electronic device of claim 1, wherein the feed point is disposed between the first closed slot and the second closed slot, and the feed point and the ground point are disposed on two sides of the second closed slot.

4. The electronic device of claim 1, wherein the first closed slot is parallel to the second closed slot.

5. The electronic device of claim 1, wherein an orthographic projection of the feed portion on the conductive housing and an orthographic projection of the ground portion on the conductive housing are located on two sides of the second closed slot.

6. The electronic device of claim 1, wherein the first conductive holes pass through the feed extension portion, the circuit substrate and the feed portion, and the feed portion is electrically connected to the feed point through the circuit substrate, the feed extension portion and the first connection portion.

7. The electronic device of claim 6, wherein an orthographic projection of the feed portion on the conductive housing, an orthographic projection of the feed extension portion on the conductive housing and the feed point of the conductive housing overlap each other.

8. The electronic device of claim 6, wherein an orthographic projection of the feed portion on the circuit substrate and an orthographic projection of the feed extension portion on the circuit substrate partially overlap each other and are of the same shape.

9. The electronic device of claim 1, wherein the feed device further comprises:
   a ground extension portion, disposed on the first surface and located between the first surface and the second connection portion, wherein the second conductive holes pass through the ground extension portion, the circuit substrate and the ground portion, the ground portion is electrically connected to the ground point through the circuit substrate, the ground extension portion and the second connection portion.

10. The electronic device of claim 9, wherein an orthographic projection of the ground portion on the conductive housing, an orthographic projection of the ground extension portion on the conductive housing and the ground point of the conductive housing overlap each other.

11. The electronic device of claim 9, wherein an orthographic projection of the ground portion on the circuit substrate and an orthographic projection of the ground extension portion on the circuit substrate overlap each other and are of the same shape.

12. The electronic device of claim 1, wherein the first connection portion and the second connection portion are metal elastic pieces or conductive gaskets.

13. The electronic device of claim 1, further comprising a second body, wherein the second body is pivoted to a side of the first body so as to rotate with respect to the first body.

14. An electronic device, comprising:
a first body having a conductive housing, the conductive housing having a first closed slot, a second closed slot, a feed point and a ground point; and
a feed device disposed in the first body, the feed device including:
   a circuit substrate, having a first surface, a second surface, a plurality of first conductive holes and a plurality of second conductive holes, wherein the first surface faces the conductive housing and is opposite to the second surface;
   a feed portion and a ground portion, disposed on the second surface; and
   a first connection portion and a second connection portion disposed on the first surface, wherein the feed portion is electrically connected to the feed point through the plurality of first conductive holes and the first connection portion of the circuit substrate, and the ground portion is electrically connected to the ground point through the plurality of second conductive holes and the second connection portion of the circuit substrate,
wherein the feed device and the conductive housing form an antenna, the antenna operates in a first band through a first path formed by the first closed slot and operates in a second band through a second path formed by the second closed slot,
wherein the feed point is disposed between the first closed slot and the second closed slot, and the feed point and the ground point are disposed on two sides of the second closed slot.

15. An electronic device, comprising:
a first body having a conductive housing, the conductive housing having a first closed slot, a second closed slot, a feed point and a ground point; and
a feed device disposed in the first body, the feed device including:
   a circuit substrate, having a first surface, a second surface, a plurality of first conductive holes and a plurality of second conductive holes, wherein the first surface faces the conductive housing and is opposite to the second surface;
   a feed portion and a ground portion, disposed on the second surface;
   a first connection portion and a second connection portion disposed on the first surface, wherein the feed portion is electrically connected to the feed point through the plurality of first conductive holes and the first connection portion of the circuit substrate, and the ground portion is electrically connected to the ground point through the plurality of second conductive holes and the second connection portion of the circuit substrate; and
   a feed extension portion, disposed on the first surface and located between the first surface and the first connection portion,
wherein the feed device and the conductive housing form an antenna, the antenna operates in a first band through a first path formed by the first closed slot and operates in a second band through a second path formed by the second closed slot,
wherein the first conductive holes pass through the feed extension portion, the circuit substrate and the feed portion, and the feed portion is electrically connected to the feed point through the circuit substrate, the feed extension portion and the first connection portion.

16. The electronic device of claim 15, wherein an orthographic projection of the feed portion on the conductive housing, an orthographic projection of the feed extension portion on the conductive housing and the feed point of the conductive housing overlap each other.

17. The electronic device of claim 15, wherein an orthographic projection of the feed portion on the circuit substrate and an orthographic projection of the feed extension portion on the circuit substrate partially overlap each other and are of the same shape.

* * * * *